(12) United States Patent
Chiu et al.

(10) Patent No.: US 12,272,238 B2
(45) Date of Patent: Apr. 8, 2025

(54) NEAR-FIELD SENSING INFORMATION TRANSMISSION AND PAIRING SYSTEM FOR AIR-LAND UNMANNED VEHICLES AND METHOD THEREOF

(71) Applicants: SQ Technology (Shanghai) Corporation, Shanghai (CN); Inventec Corporation, Taipei (TW)

(72) Inventors: Chuan-Cheng Chiu, Taipei (TW); Hong-Tao Zhang, Shanghai (CN)

(73) Assignees: SQ Technology (Shanghai) Corporation, Shanghai (CN); Inventec Corporation, Taipei (TW)

( * ) Notice: Subject to any disclaimer, the term of this patent is extended or adjusted under 35 U.S.C. 154(b) by 292 days.

(21) Appl. No.: 17/843,635

(22) Filed: Jun. 17, 2022

(65) Prior Publication Data

US 2023/0306845 A1  Sep. 28, 2023

(30) Foreign Application Priority Data

Mar. 24, 2022 (CN) .......................... 202210296605.4

(51) Int. Cl.
*G08G 1/09* (2006.01)
*B64C 39/02* (2023.01)
(Continued)

(52) U.S. Cl.
CPC ..... *G08G 1/096791* (2013.01); *B64C 39/024* (2013.01); *G08G 1/096844* (2013.01);
(Continued)

(58) Field of Classification Search
CPC ....... G08G 1/096791; G08G 1/096844; G08G 1/164; G08G 1/166; H04W 4/44;
(Continued)

(56) References Cited

U.S. PATENT DOCUMENTS

| 2018/0075759 A1* | 3/2018 | Kim | ................. G08G 1/096827 |
| 2019/0114929 A1* | 4/2019 | Sasaki | ................. G08G 5/0069 |

(Continued)

OTHER PUBLICATIONS

Luo et al., Traffic collisions early warning aided by small unmanned aerial vehicle companion, Mar. 3, 2016, Telecommun Syst. (Year: 2016).*

*Primary Examiner* — Yufeng Zhang
(74) *Attorney, Agent, or Firm* — David R. Stevens; Stevens Law Group (57) ABSTRACT

A near-field sensing information transmission and pairing system for air-land unmanned vehicles and a method thereof are disclosed. The unmanned aviation vehicle is driven to move along a forward route of an unmanned ground vehicle in advance, and continuously senses whether an obstacle or a traffic control appears in the forward route; when sensing the presence of the obstacle or the traffic control feature, the unmanned aviation vehicle generates and transmits a re-routing signal to the unmanned ground vehicle, an alternative route is calculated to replace the original forward route based on map information, a current coordinate, an obstacle coordinate and a destination coordinate, so as to increase a reaction time of the unmanned ground vehicle, thereby achieving the technical effect of improving immediacy of the unmanned ground vehicle to avoid a roadblock.

8 Claims, 5 Drawing Sheets

(51) Int. Cl.
    *G08G 1/0967*     (2006.01)
    *G08G 1/0968*     (2006.01)
    *G08G 1/16*     (2006.01)
    *H04W 4/44*     (2018.01)
    *H04W 4/80*     (2018.01)
    *H04W 12/50*     (2021.01)
    *B64U 50/19*     (2023.01)
    *B64U 101/30*     (2023.01)

(52) U.S. Cl.
    CPC .............. *G08G 1/164* (2013.01); *G08G 1/166* (2013.01); *H04W 4/44* (2018.02); *H04W 4/80* (2018.02); *H04W 12/50* (2021.01); *B64U 50/19* (2023.01); *B64U 2101/30* (2023.01); *B64U 2201/10* (2023.01)

(58) Field of Classification Search
    CPC ...... H04W 4/80; H04W 12/50; B64C 39/024; B64U 2101/30; B64U 2201/10; B64U 50/19
    See application file for complete search history.

(56) References Cited

U.S. PATENT DOCUMENTS

2021/0276553 A1*   9/2021   Niewiadomski ....... G06N 20/00
2021/0357664 A1*   11/2021   Kocer ................... G06V 20/17

* cited by examiner

NEAR-FIELD SENSING INFORMATION TRANSMISSION AND PAIRING SYSTEM FOR AIR-LAND UNMANNED VEHICLES AND METHOD THEREOF

CROSS-REFERENCE TO RELATED APPLICATION

This application claims the benefit of Chinese Application Serial No. 202210296605.4, filed Mar. 24, 2022, which is hereby incorporated herein by reference in its entirety.

BACKGROUND OF THE INVENTION

1. Field of the Invention

The present invention relates to a transmission and pairing system and a method thereof, and more particularly to a near-field sensing information transmission and pairing system for air-land unmanned vehicles and a method thereof.

2. Description of the Related Art

In recent years, with the popularity and vigorous development of driverless technology, it is no longer uncommon to see self-driving vehicles on the road. However, due to no human driver in the self-driving vehicle, the emergency response capability of self-driving vehicle is not good enough compared with the human driver; therefore, how to improve the emergency response capability of self-driving vehicles has become one of the key issues that manufacturers are eager to improve.

In general, the unmanned ground vehicle (such as a self-driving car) is equipped with a camera element and a distance measuring element to recognize various objects on the road, and also obtains positioning coordinates from a positioning system. When detecting presence of an obstacle or a traffic control event which may cause failure of forward movement, the conventional unmanned ground vehicle may be too late to respond or change lane; for example, when the conventional unmanned ground vehicle encounters an obstacle to be blocked in a single lane and there is also other vehicle behind, the only thing the conventional unmanned ground vehicle can do is to wait for the vehicles behind to reverse. Therefore, the conventional unmanned ground vehicle has a problem in poor immediacy of avoiding roadblocks.

In view of this, some companies proposed a technical solution of artificial assistance system, which transmits the relevant information of the self-driving vehicle to a remote end when the self-driving car encounters an emergency, so that an operator at the remote end is able to remotely drive the self-driving vehicle to perform troubleshooting for the emergency situation; however, this technical solution can solve few emergency situations only. For example, in the above-mentioned emergency situation occurred on the single lane, even the remote operator takes over the self-driving vehicle, it is still necessary to wait for the vehicle behind to reverse; that is, the above-mentioned technical solution is still unable to obtain a message indicative of the front obstacle in advance to re-route the self-driving vehicle to prevent the dilemma. As a result, the above-mentioned technical solution still has a problem of poor immediacy of unmanned ground vehicle to avoid roadblocks.

According to above-mentioned contents, what is needed is to develop an improved technical solution to solve the problem that the poor immediacy of the unmanned ground vehicle to avoid roadblocks.

SUMMARY OF THE INVENTION

An objective of the present invention is to disclose a near-field sensing information transmission and pairing system for air-land unmanned vehicles and a method thereof, so as to solve the conventional technical problems.

In order to achieve the objective, the present invention provides a near-field sensing information transmission and pairing system for air-land unmanned vehicles; the near-field sensing information transmission and pairing system includes an unmanned aviation vehicle and an unmanned ground vehicle. The unmanned aviation vehicle includes a detection module, a transceiver module and a flight module. When the unmanned aviation vehicle is moving along a forward route, the detection module is configured to enable at least one sensor and an image recognition unit to continuously sense at least one obstacle or a traffic control feature located on ground of the forward route. The transceiver module is connected to the detection module, wherein when sensing presence of the obstacle or the traffic control feature, the transceiver module generates and transmits a re-routing signal having at least one obstacle coordinate based on a position of the obstacle or the traffic control feature, and receives the forward route and an alternative route. The flight module is connected to the transceiver module and configured to control the unmanned aviation vehicle to fly along the forward route, wherein when receiving the alternative route, the flight module controls the unmanned aviation vehicle to fly along the alternative route, instead of the forward route.

The unmanned ground vehicle is configured to perform information transmission with the unmanned aviation vehicle through wireless communication pairing, wherein when a plane distance between the unmanned aviation vehicle and the unmanned ground vehicle satisfies an interval distance, the unmanned ground vehicle moves along the forward route, when the plane distance is lower than the interval distance, the unmanned ground vehicle stops moving. The unmanned ground vehicle includes a positioning module, a map module, a transmission module and a calculation module. The positioning module is configured to continuously obtain a current coordinate from a positioning system when the unmanned ground vehicle is moving along the forward route. The map module is configured to store map information, wherein the map information comprises geographic information and the forward route which is from the current coordinate to a destination coordinate. The transmission module is connected to the positioning module and the map module, and configured to transmit the forward route to the unmanned aviation vehicle in initial to make the unmanned aviation vehicle move along the forward route, and receive the re-routing signal transmitted from the unmanned aviation vehicle. The calculation module is connected to the positioning module, the map module, and the transmission module, and wherein when receiving the re-routing signal, the calculation module loads the map information from the map module, and calculates the alternative route for replacing the forward route based on the current coordinate, the obstacle coordinate and the destination coordinate, and transmits the alternative route to the unmanned aviation vehicle through the transmission module.

In order to achieve the objective, the present invention provides a near-field sensing information transmission and pairing method for air-land unmanned vehicles; the near-field sensing information transmission and pairing method is applied to collaborative operating environment where an unmanned aviation vehicle and an unmanned ground vehicle are located, and includes steps of: performing information transmission between the unmanned ground vehicle and the unmanned aviation vehicle through wireless communication pairing, wherein the unmanned ground transmits a forward route to the unmanned aviation vehicle in initial, to make the unmanned aviation vehicle to move along the forward route, and after a plane distance between the unmanned aviation vehicle and the unmanned ground vehicle satisfies an interval distance, the unmanned ground vehicle moves along the forward route, when the plane distance is lower than the interval distance, stopping moving the unmanned ground vehicle; when the unmanned aviation vehicle is moving along the forward route, enabling at least one sensor and an image recognition unit to continuously sense at least one of an obstacle or a traffic control feature located on ground of the forward route, wherein the unmanned ground vehicle continuously obtains a current coordinate from a positioning system when the unmanned ground vehicle is moving along the forward route; when sensing presence of the obstacle or the traffic control feature, generating and transmitting a re-routing signal having at least one obstacle coordinate to the unmanned ground vehicle based on a position of the obstacle or the traffic control feature, by the unmanned aviation vehicle; when the unmanned ground vehicle receives the re-routing signal, loading stored map information, wherein the map information comprises geographic information having the forward route which is from the current coordinate to a destination coordinate; calculating an alternative route based for replacing the forward route on the current coordinate, the obstacle coordinate, the destination coordinate, and the loaded map information, and transmitting the alternative route to the unmanned aviation vehicle, by the unmanned ground vehicle; when the unmanned aviation vehicle receives the alternative route, controlling the unmanned aviation vehicle to fly along the alternative route, instead of the forward route.

According to the above-mentioned system and method of the present invention, the difference between the present invention and the conventional technology is that the unmanned aviation vehicle is driven to move along the forward route of the unmanned ground vehicle in advance, and continuously senses whether the obstacle or the traffic control appears in the forward route; when sensing the presence of the obstacle or the traffic control feature, the unmanned aviation vehicle generates and transmits the re-routing signal to the unmanned ground vehicle, the alternative route is calculated to replace the original forward route based on map information, a current coordinate, an obstacle coordinate and a destination coordinate, so as to increase a reaction time of the unmanned ground vehicle.

Therefore, the above-mentioned solution of the present invention is able to achieve the technical effect of improving immediacy of the unmanned ground vehicle to avoid a roadblock.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Figure 1:
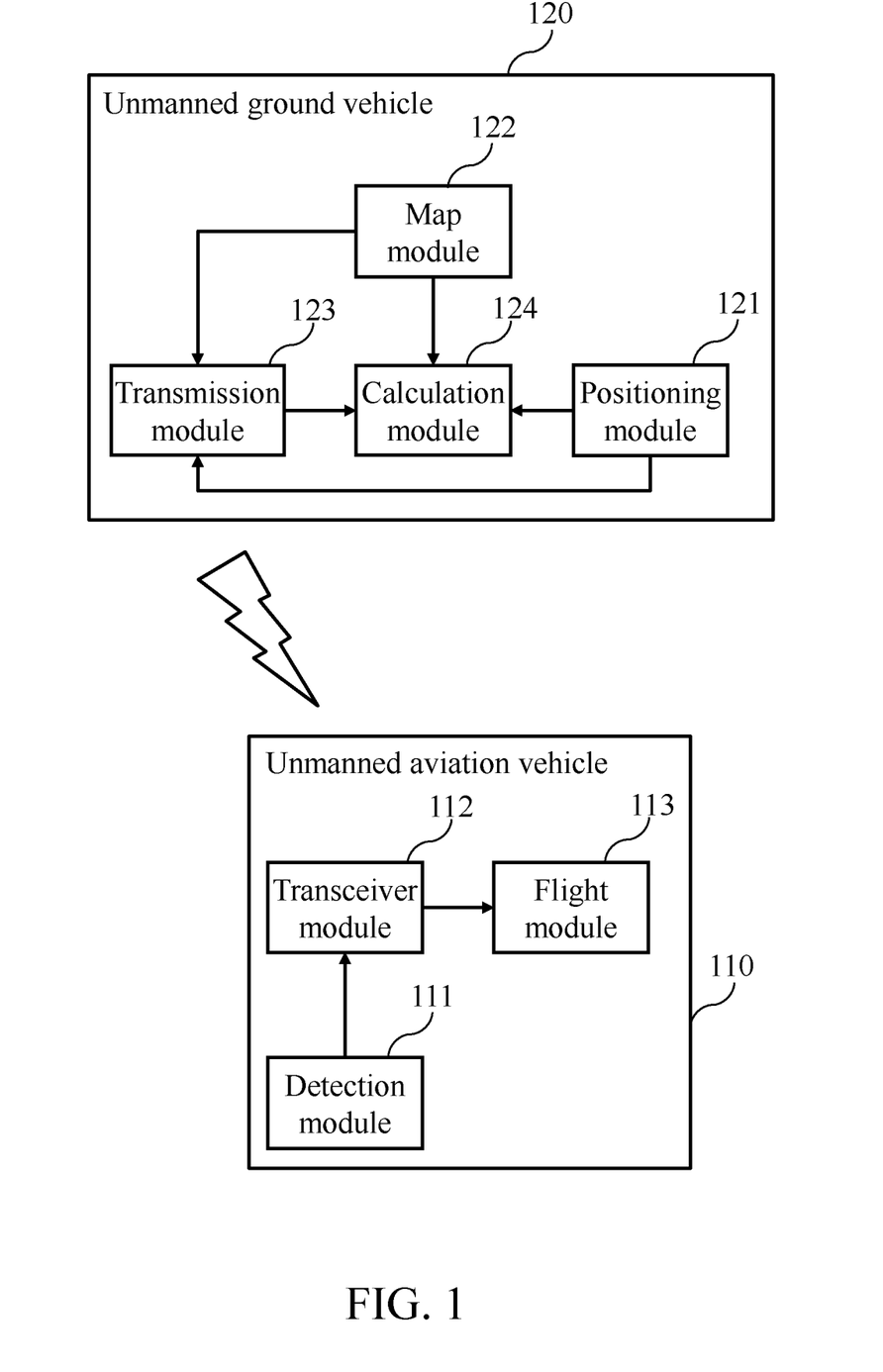
FIG. 1 is a system block diagram of a near-field sensing information transmission and pairing system for air-land unmanned vehicles, according to the present invention.

Please refer to FIG. 1, which is a system block diagram of a near-field sensing information transmission and pairing system for air-land unmanned vehicles, according to the present invention. As shown in FIG. 1, the near-field sensing information transmission and pairing system includes an unmanned aviation vehicle 110 and an unmanned ground vehicle 120. The unmanned aviation vehicle 110 includes a detection module 111, a transceiver module 112, and a flight module 113. When the unmanned aviation vehicle is moving along a forward route, the detection module 111 enables at least one sensor and an image recognition unit to continuously sense an obstacle or a traffic control feature located on ground of the forward route. In actual implementation, the at least one sensor can include an image sensor, at least one of a near-field optical sensor and a distance sensor, and the at least one sensor is configured to sense a plane distance between the unmanned aviation vehicle 110 and the unmanned ground vehicle 120, and transmit the plane distance to the unmanned ground vehicle 120. For example, the operation of sensing the obstacle or the traffic control feature can be implemented by AI algorithm using deep learning-based model such as region based convolutional neural network (R-CNN), fast region based convolutional neural network (Fast R-CNN), faster region based convolutional neural network (Faster R-CNN), Mask R-CNN or YOLO; for example, the obstacles or the traffic control features can be inputted into the AI model as training data for training, and the sensed images are inputted into the well-trained model to determine whether the sensed image matches one of the obstacles or the traffic control features.

The transceiver module 112 is connected to the detection module 111; when sensing presence of the obstacle or the traffic control feature, the transceiver module generates and transmits a re-routing signal having an obstacle coordinate, based on a position of the obstacle or the traffic control feature. The transceiver module 112 also receives the forward route and an alternative route. In actual implementation, when the unmanned ground vehicle 120 receives the plane distance and determines that the plane distance satisfies the interval distance, the unmanned ground vehicle 120 is driven to move along the forward route, when the plane distance is lower than the interval distance, the unmanned ground vehicle 120 stops moving. In addition, the transceiver module 112 of the unmanned ground vehicle 120 continuously transmits a current coordinate to the unmanned aviation vehicle 110, when the unmanned aviation vehicle 110 detects that the battery power to is lower than the threshold, the unmanned aviation vehicle 110 is driven to move to a position of the unmanned ground vehicle 120 from the current coordinate. In an embodiment, the threshold is dynamically adjustable based on the current interval distance, to make the threshold positively correlate to the interval distance, for example, in response to the longer interval distance, the threshold can be adjusted to be higher; for example, when the interval distance is changed from 5 m to 10 m, the threshold can be adjusted from 20% of the battery power to 40% of the battery power, so that the unmanned aviation vehicle 110 can have sufficient battery power to move to and land on the unmanned ground vehicle 120 for charging.

The flight module 113 is connected to the transceiver module 112 and configured to control the unmanned aviation vehicle 110 to fly along the forward route; when receiving the alternative route from the unmanned ground vehicle 120, the flight module 113 controls the unmanned aviation vehicle 110 to fly along the alternative route, instead of forward route. In actual implementation, the forward route and the alternative route are routes calculated based on the map, the current coordinate and the destination coordinate. In an embodiment, the forward route can be a shortest route (or called a shortest path), and the alternative route is a shortest route calculated in a consideration of the position of the obstacle or the traffic control feature.

The unmanned ground vehicle 120 and the unmanned aviation vehicle 110 transmit information therebetween through wireless communication pairing, and when the plane distance between the unmanned aviation vehicle 110 and the unmanned ground vehicle 120 satisfies an interval distance, the unmanned ground vehicle 120 moves along the forward route. The unmanned ground vehicle 120 includes a positioning module 121, a map module 122, a transmission module 123, and a calculation module 124. When the unmanned ground vehicle is moving along the forward route, the positioning module 121 continuously obtains the current coordinate (such as longitude and latitude) from the positioning system. In actual implementation, the positioning module 121 can be implemented by a global positioning system (GPS), BeiDou navigation satellite system (BDS), Galileo positioning system, global navigation satellite system (GLONASS), or other similar positioning system.

The map module 122 is configured to store the map information having geographic information, and the forward route from the current coordinate to a destination coordinate. In actual implementation, the map module 122 can be implemented by a geographic information system, and is used to input, store, query, analyze, and display geographic data.

The transmission module 123 is connected to the positioning module 121 and the map module 122, and configured to transmit the forward route to the unmanned aviation vehicle 110 in initial, to make the unmanned aviation vehicle 110 move along the forward route; the transmission module 123 also receives the re-routing signal transmitted from the unmanned aviation vehicle 110. In actual implementation, the transmission module 123 transmits the forward route and the re-routing signal through wireless communication technology, such as wireless network, cellular network, short distance peer-to-peer communication network, or wireless sensor network.

The calculation module 124 is connected to the positioning module 121, the map module 122, and the transmission module 123, and configured to load the map information from the map module 122 when receiving the re-routing signal, and then calculate the alternative route for replacing the forward route based on the current coordinate, the obstacle coordinate and the destination coordinate, and transmit the alternative route to the unmanned aviation vehicle 110 through the transmission module 123. In actual implementation, the calculation of the alternative route can be implemented with Dijkstra algorithm, K shortest path (KSP) algorithm, or other similar algorithm.

It is to be particularly noted that, in actual implementation, the modules of the present invention can be implemented by various manners, including software, hardware or any combination thereof, for example, in an embodiment, the module can be implemented by software and hardware, or one of software and hardware. Furthermore, the present invention can be implemented fully or partly based on hardware, for example, one or more module of the system can be implemented by integrated circuit chip, system on chip (SOC), a complex programmable logic device (CPLD), or a field programmable gate array (FPGA). The concept of the present invention can be implemented by a system, a method and/or a computer program. The computer program can include computer-readable storage medium which records computer readable program instructions, and the processor can execute the computer readable program instructions to implement concepts of the present invention. The computer-readable storage medium can be a tangible apparatus for holding and storing the instructions executable of an instruction executing apparatus Computer-readable storage medium can be, but not limited to electronic storage apparatus, magnetic storage apparatus, optical storage apparatus, electromagnetic storage apparatus, semiconductor storage apparatus, or any appropriate combination thereof. More particularly, the computer-readable storage medium can include a hard disk, an RAM memory, a read-onlymemory, a flash memory, an optical disk, a floppy disc or any appropriate combination thereof, but this exemplary list is not an exhaustive list. The computer-readable storage medium is not interpreted as the instantaneous signal such as a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network, and forward the computer readable program instruction to store in computer-readable storage medium of each calculating/processing apparatus. The computer program instructions for executing the operation of the present invention can include source code or object code programmed by assembly language instructions, instruction-set-structure instructions, machine instructions, machine-related instructions, micro instructions, firmware instructions or any combination of one or more programming language. The programming language include object oriented programming language, such as Common Lisp, Python, C++, Objective-C, Smalltalk, Delphi, Java, Swift, C#, Perl, Ruby, and PHP, or regular procedural programming language such as C language or similar programming language. The computer readable program instruction can be fully or partially executed in a computer, or executed as independent software, or partially executed in the client-end computer and partially executed in a remote computer, or fully executed in a remote computer or a server.

Figure 2A:
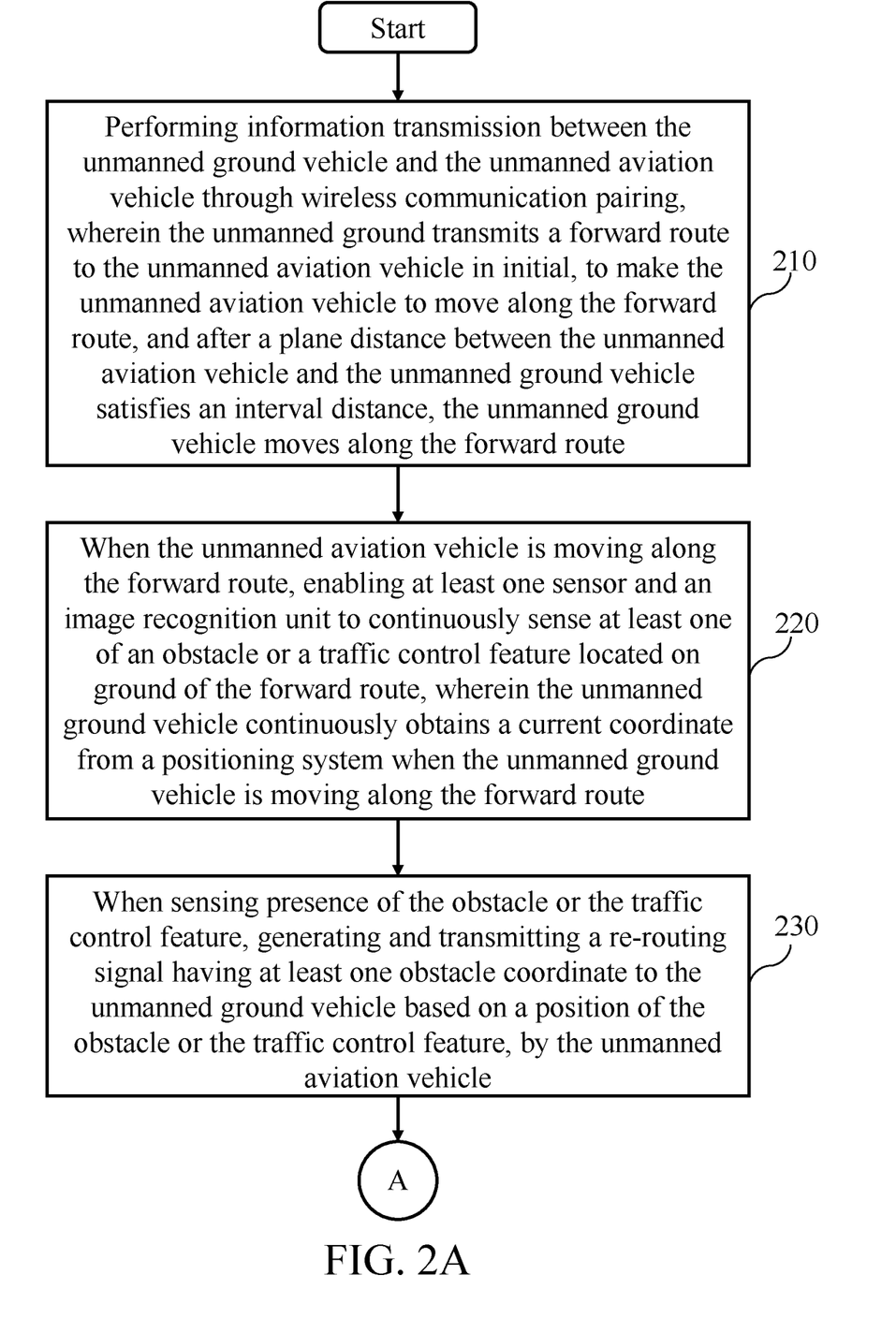
FIGS. 2A and 2B are flowcharts of a near-field sensing information transmission and pairing method for air-land unmanned vehicles, according to the present invention.
Figure 2B:
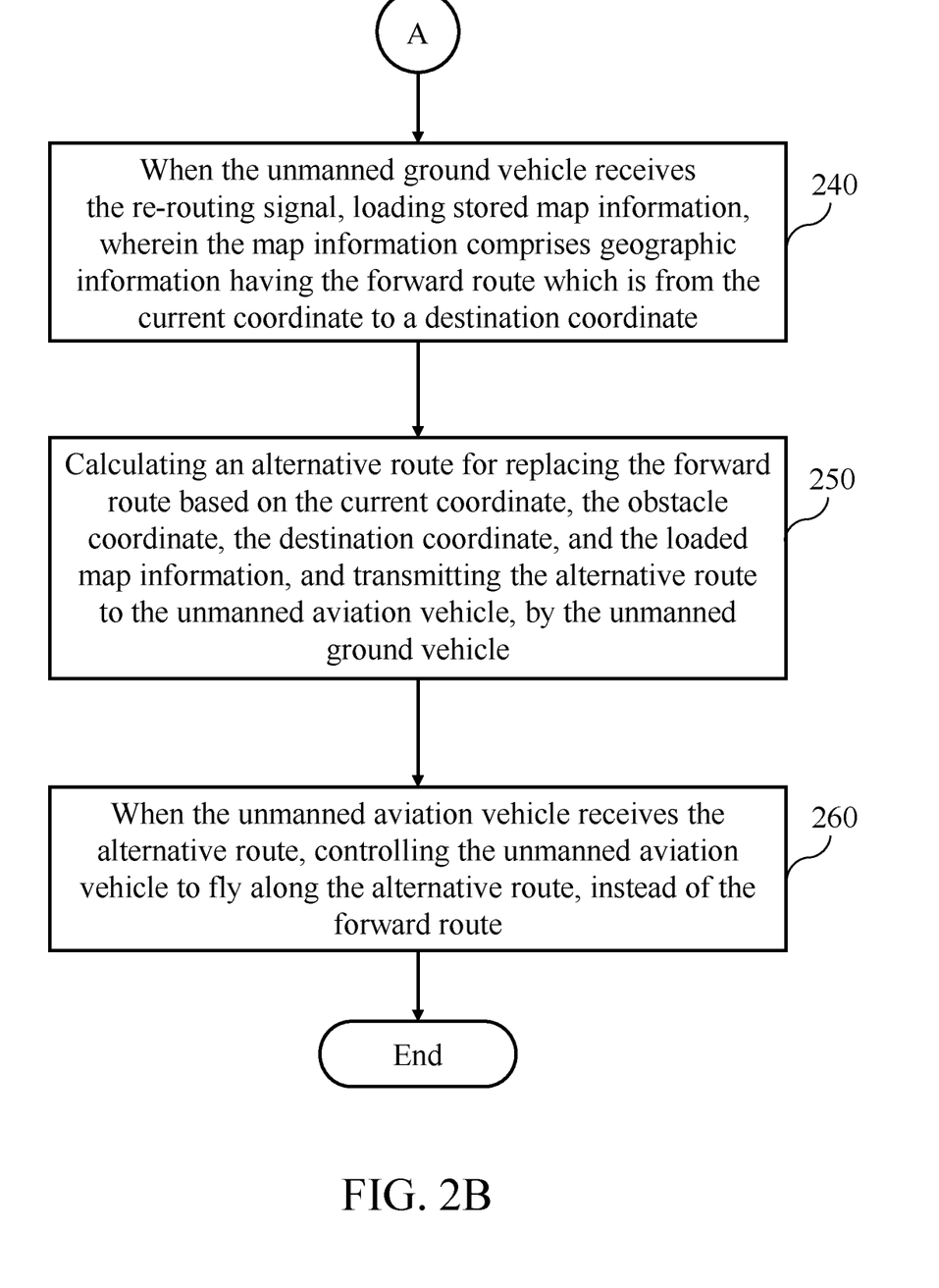

Please refer to FIGS. 2A and 2B, which are flowcharts of a near-field sensing information transmission and pairing method for air-land unmanned vehicles, according to the present invention. The near-field sensing information transmission and pairing method is applied to collaborative operating environment where an unmanned aviation vehicle 110 and an unmanned ground vehicle 120 are located, and includes the following steps. In a step 210, the unmanned ground vehicle 120 and the unmanned aviation vehicle 110 transmit information therebetween through wireless communication pairing, and the unmanned ground vehicle 120 transmits a forward route to the unmanned aviation vehicle 110 in initial, to make the unmanned aviation vehicle 110 to move along the forward route, and when a plane distance between the unmanned aviation vehicle 110 and the unmanned ground vehicle 120 satisfies an interval distance, the unmanned ground vehicle 120 moves along the forward route. In a step 220, when the unmanned aviation vehicle 110 is moving along the forward route, a sensor and an image recognition unit are enabled to continuously sense an obstacle or a traffic control feature located on ground of the forward route, and when the unmanned ground vehicle 120 is moving along the forward route, the unmanned ground vehicle 120 continuously obtains a current coordinate from a positioning system. In a step 230, when sensing presence of the obstacle or the traffic control feature, the unmanned aviation vehicle 110 generates and transmits a re-routing signal having an obstacle coordinate to the unmanned ground vehicle 120 based on a position of the obstacle or the traffic control feature. In a step 240, when the unmanned ground vehicle 120 receives the re-routing signal, the unmanned ground vehicle 120 loads stored map information, the map information having geographic information, and the forward route from the current coordinate to a destination coordinate. In a step 250, the unmanned ground vehicle 120 calculates the alternative route based on the loaded map information, the current coordinate, the obstacle coordinate and the destination coordinate, and transmits the alternative route to the unmanned aviation vehicle 110. In a step 260, when the unmanned aviation vehicle 110 receives the alternative route, the unmanned aviation vehicle 110 is controlled to fly along the alternative route, instead of the original forward route. Therefore, the unmanned aviation vehicle 110 can be driven to move to the forward route of the unmanned ground vehicle 120 in advance, continuously sense whether the obstacle or the traffic control event appears on the forward route, and when sensing the presence of the obstacle or the traffic control event, the unmanned aviation vehicle 110 generates and transmits the re-routing signal to the unmanned ground vehicle 120, and the alternative route is calculated to replace the original forward route based on the map information, the current coordinate, the obstacle coordinate and the destination coordinate. As a result, a reaction time of the unmanned ground vehicle 120 can be increased, let the unmanned aviation vehicle 110 and the unmanned ground vehicle 120 both go along the alternative route.

Figure 3:
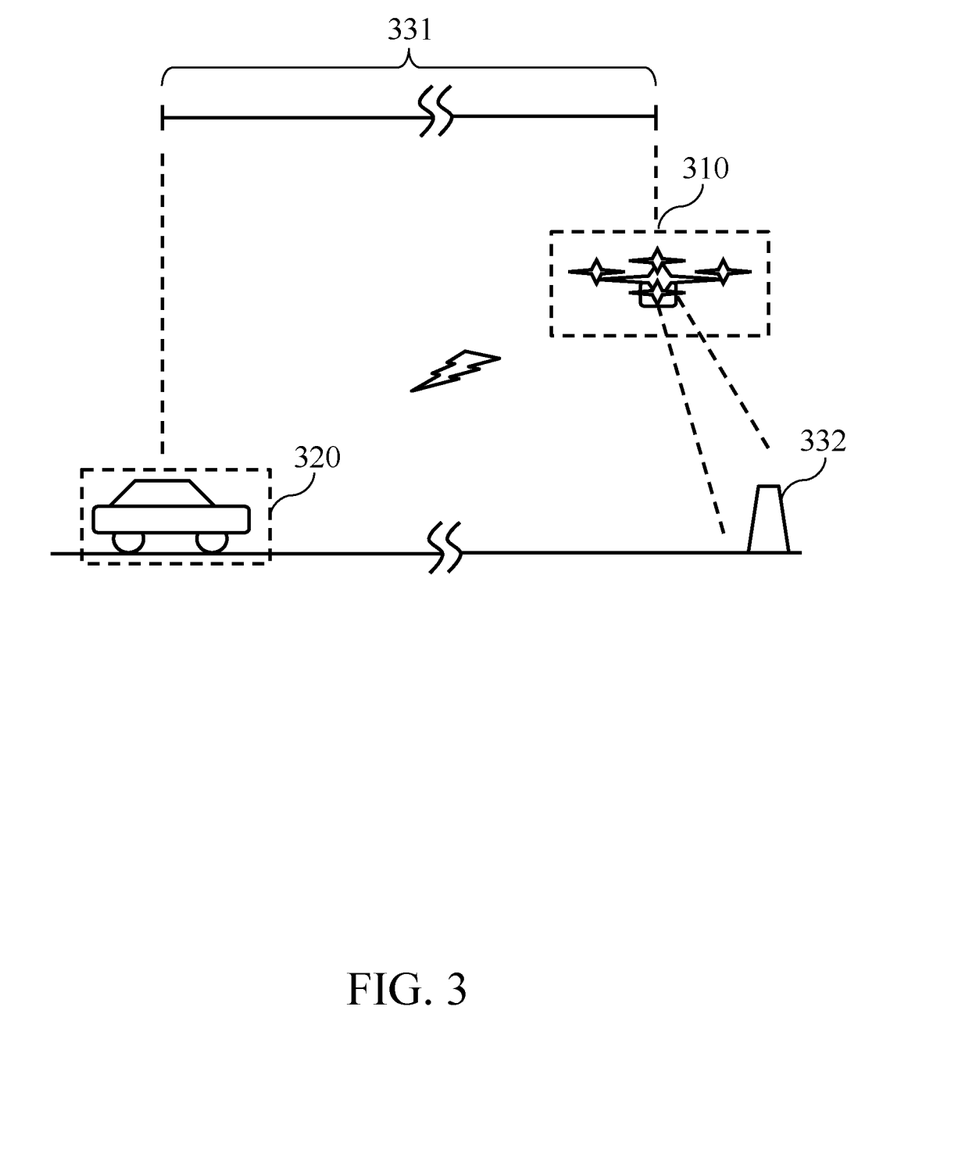
FIG. 3 is a schematic view of a cooperative operation of air-land unmanned vehicles, according to an application of the present invention.

The embodiment of the present invention will be illustrated with reference to FIGS. 3 and 4. Please refer to FIG. 3, which is a schematic view of a cooperative operation of an air-land unmanned vehicles, according to an application of the present invention. As shown in FIG. 3, an unmanned ground vehicle 320 and an unmanned aviation vehicle 310 transmit information therebetween through wireless communication pairing, and the unmanned ground vehicle 320 transmits a preset forward route to the unmanned aviation vehicle 310 in initial, to make the unmanned aviation vehicle 310 to move along the forward route until a plane distance between the unmanned aviation vehicle 310 and the unmanned ground vehicle 320 satisfies an interval distance 331. When the plane distance between the unmanned aviation vehicle 310 and the unmanned ground vehicle 320 satisfies the interval distance 331, the unmanned ground vehicle 320 moves along the forward route, for example, in a condition that the interval distance 331 is 10 m, when the plane distance between the unmanned aviation vehicle 310 and the unmanned ground vehicle 320 is 10 m, it indicates that the condition is satisfied. When the unmanned aviation vehicle 310 is moving along the forward route, a sensor and an image recognition unit are enabled to continuously sense an obstacle 332 or a traffic control feature located on ground of the forward route, and the unmanned ground vehicle 320 continuously obtains the current coordinate from a positioning system. Next, when the unmanned aviation vehicle 310 senses the presence of the obstacle 332 or the traffic control feature, the unmanned aviation vehicle 310 generates and transmits the re-routing signal having the obstacle coordinate to the unmanned ground vehicle 320, based on the position of the obstacle 332 or the traffic control feature. When the unmanned ground vehicle 320 receives the re-routing signal, the unmanned ground vehicle 320 loads the stored map information, and the map information has the geographic information, and the forward route from the current coordinate to the destination coordinate. The unmanned ground vehicle 320 calculates the alternative route based on the loaded map information, the current coordinate, the obstacle coordinate and the destination coordinate, and transmits the alternative route to the unmanned aviation vehicle 310; when the unmanned aviation vehicle 310 receives the alternative route, the unmanned aviation vehicle 310 is controlled to fly along the alternative route, instead of the forward route. Therefore, the cooperative operation of the air-land unmanned vehicles (such as the unmanned aviation vehicle 310 and the unmanned ground vehicle 320) can be implemented by near-field sensing information transmission and pairing, let the unmanned aviation vehicle 310 and the unmanned ground vehicle 320 both go along the alternative route, so that the unmanned ground vehicle 320 can have sufficient reaction time to avoid the obstacle or traffic control condition.

Figure 4:
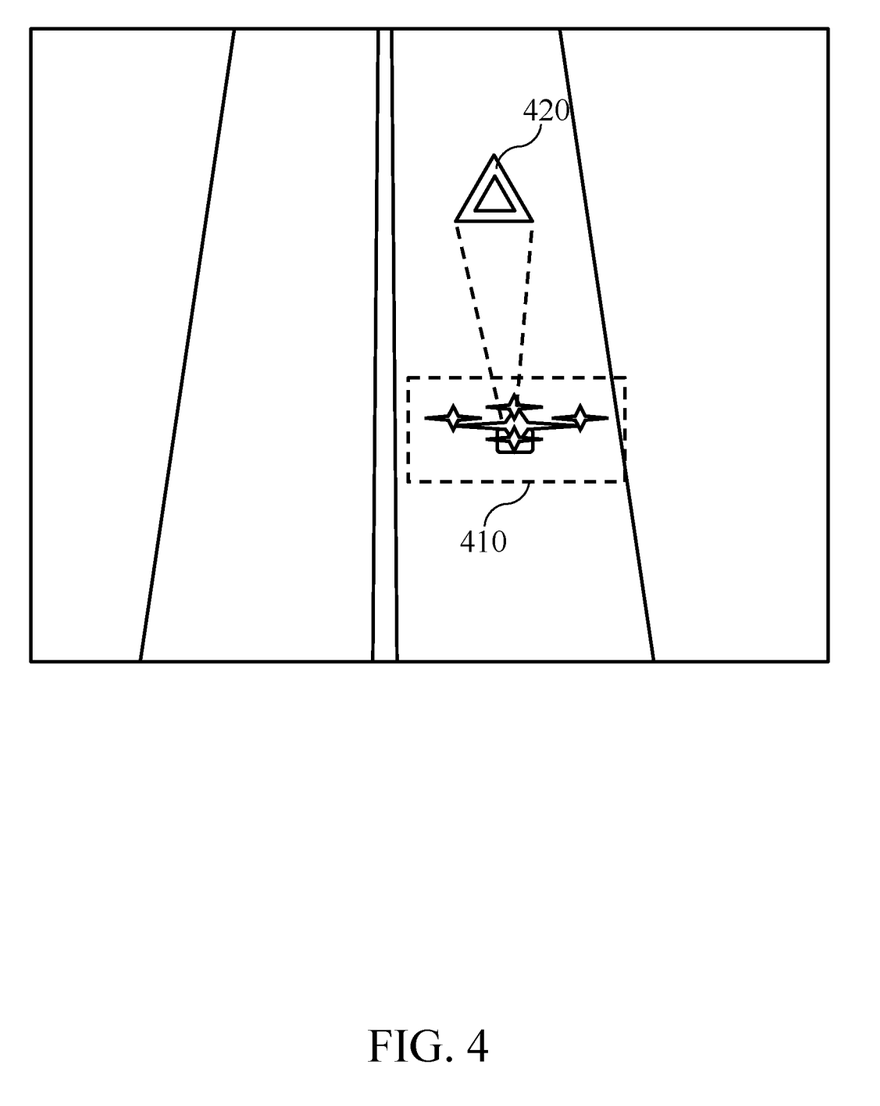
FIG. 4 is a schematic view of an operation to sense a traffic control feature, according to an application of the present invention.

As shown in FIG. 4, which is a schematic view of an operation to sense a traffic control feature, according to the present invention. In actual implementation, the traffic control images (such as images of warning triangle 420, a traffic cone and a traffic police) can be used as the training data to train the AI model to recognize a traffic control feature. In this way, the image recognition unit of the unmanned aviation vehicle 410 can use the well-trained AI model to sense the traffic control feature, and generate the re-routing signal having the obstacle coordinate when sensing the presence of the traffic control feature; for example, when the presence of the traffic control feature is sensed, the current positioning coordinate of the unmanned aviation vehicle 410 can be directly used as the obstacle coordinate; on the other hand, feature values can be extracted from the images of traffic control equipment in advance and used as the traffic control features; when a matched traffic control feature exists in the ground image sensed by the image sensor, the unmanned aviation vehicle 410 can generate the re-routing signal having the obstacle coordinate corresponding to the position of the obstacle or the traffic control feature. Next, the unmanned aviation vehicle 410 transmits the generated re-routing signal to the unmanned ground vehicle, so that the unmanned ground vehicle can calculate the alternative route. After receiving the alternative route from the unmanned ground vehicle, the unmanned aviation vehicle 410 is controlled to fly along the alternative route, instead of the original forward route.

According to above-mentioned contents, the difference between the present invention and the conventional technology is that the unmanned aviation vehicle is driven to move along the forward route of the unmanned ground vehicle in advance, and continuously senses whether the obstacle or the traffic control appears in the forward route; when sensing the presence of the obstacle or the traffic control feature, the unmanned aviation vehicle generates and transmits the re-routing signal to the unmanned ground vehicle, the alternative route is calculated to replace the original forward route based on map information, a current coordinate, an obstacle coordinate and a destination coordinate, so as to increase a reaction time of the unmanned ground vehicle. Therefore, the above-mentioned technical solution of the present invention is able to solve the conventional problem, to achieve the technical effect of improving immediacy of the unmanned ground vehicle to avoid a roadblock.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A near-field sensing information transmission and pairing system for air-land unmanned vehicles, comprising:
    an unmanned aviation vehicle, comprising:
        a detection module, wherein when the unmanned aviation vehicle is moving along a forward route, the detection module is configured to enable at least one sensor and an image recognition unit to continuously sense at least one obstacle or a traffic control feature located on ground of the forward route;
        a transceiver module, connected to the detection module, wherein when sensing presence of the obstacle or the traffic control feature, the transceiver module generates and transmits a re-routing signal comprising at least one obstacle coordinate based on a position of the obstacle or the traffic control feature, and receives the forward route and an alternative route; and
        a flight module, connected to the transceiver module and configured to control the unmanned aviation vehicle to fly along the forward route, wherein when receiving the alternative route, the flight module controls the unmanned aviation vehicle to fly along the alternative route, instead of the forward route; and
    an unmanned ground vehicle, configured to perform information transmission with the unmanned aviation vehicle through wireless communication pairing, wherein when a plane distance between the unmanned aviation vehicle and the unmanned ground vehicle satisfies an interval distance, the unmanned ground vehicle moves along the forward route, when the plane distance is lower than the interval distance, the unmanned ground vehicle stops moving, the unmanned ground vehicle comprises:
        a positioning module, configured to continuously obtain a current coordinate from a positioning system when the unmanned ground vehicle is moving along the forward route;
        a map module, configured to store map information, wherein the map information comprises geographic information and the forward route which is from the current coordinate to a destination coordinate;
        a transmission module, connected to the positioning module and the map module, and configured to transmit the forward route to the unmanned aviation vehicle in initial to make the unmanned aviation vehicle move along the forward route, and receive the re-routing signal transmitted from the unmanned aviation vehicle; and
        a calculation module, connected to the positioning module, the map module, and the transmission module, and wherein when receiving the re-routing signal, the calculation module loads the map information from the map module, and calculates the alternative route for replacing the forward route based on the current coordinate, the obstacle coordinate and the destination coordinate, and transmits the alternative route to the unmanned aviation vehicle through the transmission module.

2. The near-field sensing information transmission and pairing system for air-land unmanned vehicles according to claim 1, wherein the at least one sensor comprises an image sensor and at least one of a near-field optical sensor and a distance sensor, wherein the at least one sensor is configured to sense the plane distance between the unmanned aviation vehicle and the unmanned ground vehicle, and transmit the plane distance to the unmanned ground vehicle.

3. The near-field sensing information transmission and pairing system for air-land unmanned vehicles according to claim 1, wherein the unmanned ground vehicle continuously transmits the current coordinate to the unmanned aviation vehicle, when the unmanned aviation vehicle detects that a battery power is lower than a threshold, the unmanned aviation vehicle is driven to move to reach the unmanned ground vehicle based on the current coordinate.

4. The near-field sensing information transmission and pairing system for air-land unmanned vehicles according to claim 3, wherein the threshold is dynamically adjustable based on the current interval distance, to make the threshold positively correlate to the interval distance.

5. A near-field sensing information transmission and pairing method for air-land unmanned vehicles, wherein the near-field sensing information transmission and pairing method is applied to collaborative operating environment where an unmanned aviation vehicle and an unmanned ground vehicle are located, and comprises:
  performing information transmission between the unmanned ground vehicle and the unmanned aviation vehicle through wireless communication pairing, wherein the unmanned ground transmits a forward route to the unmanned aviation vehicle in initial, to make the unmanned aviation vehicle to move along the forward route, and after a plane distance between the unmanned aviation vehicle and the unmanned ground vehicle satisfies an interval distance, the unmanned ground vehicle moves along the forward route, when the plane distance is lower than the interval distance, stopping moving the unmanned ground vehicle;
  when the unmanned aviation vehicle is moving along the forward route, enabling at least one sensor and an image recognition unit to continuously sense at least one of an obstacle or a traffic control feature located on ground of the forward route, wherein the unmanned ground vehicle continuously obtains a current coordinate from a positioning system when the unmanned ground vehicle is moving along the forward route;
  when sensing presence of the obstacle or the traffic control feature, generating and transmitting a re-routing signal having at least one obstacle coordinate to the unmanned ground vehicle based on a position of the obstacle or the traffic control feature, by the unmanned aviation vehicle;
  when the unmanned ground vehicle receives the re-routing signal, loading stored map information, wherein the map information comprises geographic information having the forward route which is from the current coordinate to a destination coordinate;
  calculating an alternative route for replacing the forward route based on the current coordinate, the obstacle coordinate, the destination coordinate, and the loaded map information, and transmitting the alternative route to the unmanned aviation vehicle, by the unmanned ground vehicle; and
  when the unmanned aviation vehicle receives the alternative route, controlling the unmanned aviation vehicle to fly along the alternative route, instead of the forward route.

6. The near-field sensing information transmission and pairing method for air-land unmanned vehicles according to claim 5, wherein the at least one sensor comprises an image sensor, at least one of a near-field optical sensor and a distance sensor, and the at least one sensor is configured to sense the plane distance between the unmanned aviation vehicle and the unmanned ground vehicle, and transmit the plane distance to the unmanned ground vehicle.

7. The near-field sensing information transmission and pairing method for air-land unmanned vehicles according to claim 5, further comprising:
  continuously transmitting the current coordinate to the unmanned aviation vehicle, by the unmanned ground vehicle;
  when the unmanned aviation vehicle detects that a battery power thereof is lower than a threshold, driving the unmanned aviation vehicle to move to a position of the unmanned ground vehicle based on the current coordinate, wherein the threshold is dynamically adjustable based on the current interval distance.

8. The near-field sensing information transmission and pairing method for air-land unmanned vehicles according to claim 7, wherein the threshold is dynamically adjustable based on the current interval distance, to make the threshold positively correlate to the interval distance.

\* \* \* \* \*